(12) United States Patent
Carnevali

(10) Patent No.: US 6,840,487 B2
(45) Date of Patent: Jan. 11, 2005

(54) WEIGHTED MOUNTING PLATFORM

(76) Inventor: Jeffrey D. Carnevali, 3262 - 36 Ave. SW., Seattle, WA (US) 98126

( * ) Notice: Subject to any disclaimer, the term of this patent is extended or adjusted under 35 U.S.C. 154(b) by 0 days.

(21) Appl. No.: 10/011,547

(22) Filed: Dec. 5, 2001

(65) Prior Publication Data

US 2003/0102419 A1 Jun. 5, 2003

(51) Int. Cl.⁷ .............................................. F16M 13/00
(52) U.S. Cl. .............................. 248/346.06; 248/346.2; 248/910
(58) Field of Search ............................. 248/910, 346.2, 248/346.06, 346.03, 346.01, 181.1; 312/223.4; 379/454, 455

(56) References Cited

U.S. PATENT DOCUMENTS

| | | | | |
|---|---|---|---|---|
| 855,149 | A | * 5/1907 | Vaughn et al. ............ | 248/181.1 |
| 1,509,068 | A | * 9/1924 | Herron ..................... | 248/181.1 |
| 2,219,974 | A | 10/1940 | Bellow ........................ | 220/69 |
| 2,806,131 | A | 9/1957 | Palmer ....................... | 240/1.2 |
| 2,916,184 | A | 12/1959 | Hartley et al. ................ | 220/69 |
| 3,028,702 | A | 4/1962 | St. Cyr ........................ | 45/68.4 |
| 3,312,436 | A | 4/1967 | Beghetto, Jr. ................ | 248/148 |
| 4,067,532 | A | * 1/1978 | Viteretto ..................... | 248/683 |
| 4,196,319 | A | * 4/1980 | Gates ......................... | 379/454 |
| 4,398,643 | A | * 8/1983 | Conlon ....................... | 248/500 |
| 4,788,916 | A | 12/1988 | Saxton ........................ | 108/43 |
| D310,677 | S | * 9/1990 | Stidham et al. ............ | D16/242 |
| 4,964,600 | A | 10/1990 | Lee ............................ | 248/146 |
| 5,350,147 | A | * 9/1994 | Paganus .................. | 248/346.2 |
| D397,120 | S | * 8/1998 | Liou ......................... | D14/229 |
| 5,845,885 | A | * 12/1998 | Carnevali ................ | 248/181.1 |
| 6,073,902 | A | * 6/2000 | Hiles ....................... | 248/346.2 |
| 6,220,556 | B1 | * 4/2001 | Sohrt et al. .............. | 248/279.1 |
| 6,254,044 | B1 | * 7/2001 | Lee .......................... | 248/177.1 |
| 6,315,120 | B1 | 11/2001 | Tally et al. ................ | 206/373 |
| 6,328,271 | B1 | * 12/2001 | Haage et al. .......... | 248/288.31 |
| 6,371,345 | B1 | * 4/2002 | Leyden et al. .............. | 224/553 |
| 6,397,046 | B1 | * 5/2002 | Kfoury ....................... | 455/90.1 |
| 6,439,530 | B1 | * 8/2002 | Schoenfish et al. .... | 248/346.06 |

* cited by examiner

*Primary Examiner*—Anita King
*Assistant Examiner*—Jon Szumny
(74) *Attorney, Agent, or Firm*—Charles J. Rupnick

(57) ABSTRACT

A weighted mounting platform for supporting a hand-held device, the weighted mounting platform having a plurality of flexible legs extending radially from a common central portion, the legs and common central portion being integrally formed of a heavy and malleable material; a lump of the heavy material integrally formed with each leg at an end thereof distal from the common central portion; a coating of elastomeric material formed over substantially the entire surface of the flexible legs, the common central portion and the integrally formed lumps; and an attaching means positioned at the common central portion for attaching a mounting device.

26 Claims, 4 Drawing Sheets

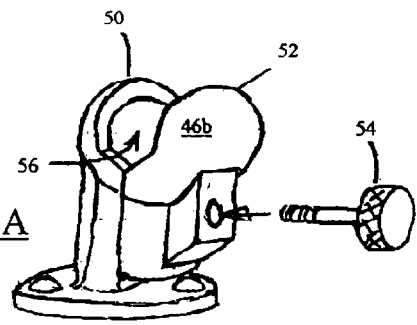
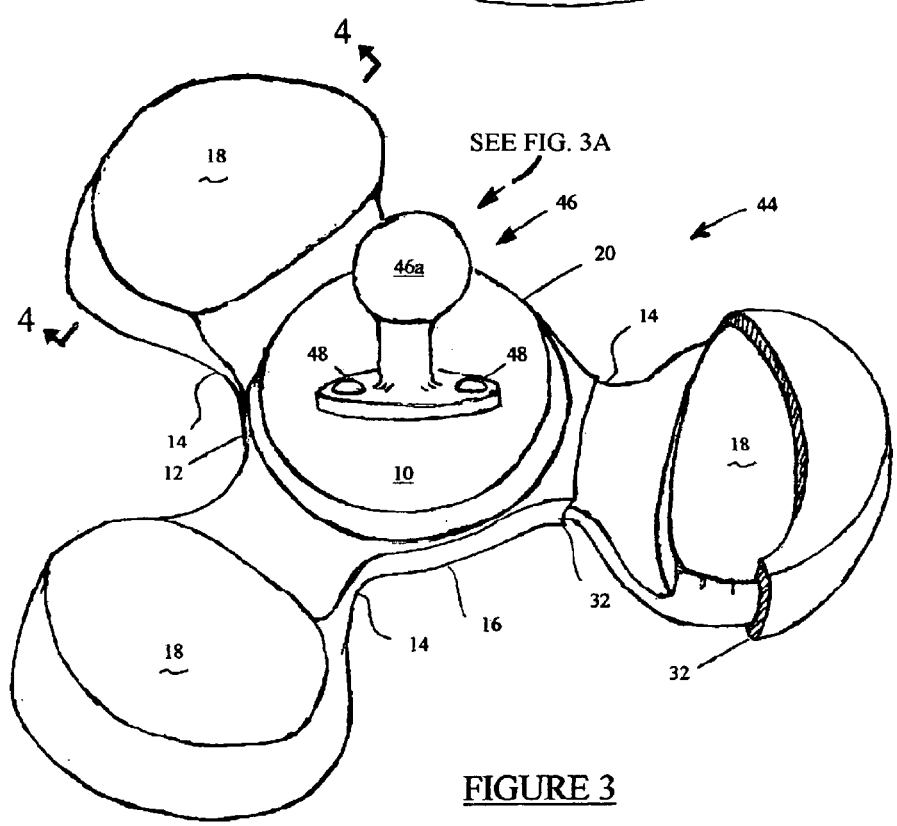

WEIGHTED MOUNTING PLATFORM

FIELD OF THE INVENTION

The present invention relates generally to mounting platforms for supporting articles in an upright orientation relative to a non-planar surface, and in particular to weighted mounting platforms that are conformable to curving and other non-planar surfaces.

BACKGROUND OF THE INVENTION

Curving and other non-planar surfaces are common in many vehicles such as automobiles, boats, and airplanes. One example is the dashboard of an automobile, which typically resembles a series of hills and valleys formed by interconnected gently and steeply curving surfaces. Another example is the usually humped console between the bucket seats of an automobile. Often, the driver and passengers desire to place small articles such as coffee cups, cellular phone stands, and map holders on the vehicle dashboard or console. Unfortunately, the curving, non-planar nature of these and other surfaces is ill suited to the usually regular mounting surface common to most articles and to the stands and holders provided to support the less regular items.

Various clamps and brackets are known that are intended to be affixed to a surface of the vehicle using screws, adhesives, or suction cups. However, the first two lack portability, while the latter will not adhere to rough, cushioned, or fabric surfaces common in many automobiles. One solution is the "bean bag" base, an example of which is described in U.S. Pat. No. 4,964,600 entitled INSULATED CUP HOLDER WITH FLEXIBLE BASE MEMBER. This solution generally involves a flexible fabric pillow-shaped bag filled with a heavy granular material such as sand, gravel or lead shot. The stand, holder, coffee cup or other article is permanently attached to the bag so that the granular material surrounds it. The granular material generally conforms itself and the fabric bag to most non-planar surfaces, and its weight both holds the article upright and keeps it from sliding when the vehicle accelerates, brakes and turns. While not described here, many other examples of this very common technology are also known. Unfortunately, this bean bag technology generally requires the assembly of many pieces in multiple assembly steps.

SUMMARY OF THE INVENTION

The present invention provides mounting platform for supporting an article in an upright orientation relative to a non-planar surface that overcomes various limitations of the prior art by providing weighted mounting platform having a web formed of a thin section of malleable material; a substantially solid weighted portion secured at a position spaced away from a central portion of the web; a flexible coating substantially covering the web and weighted portions; and attachment means positioned at the central portion of the web.

According to one aspect of the invention, the weighted portion of the mounting platform includes a plurality of legs extending radially from the central portion of the web. The malleable material is a heavy metallic substance such as lead. The weighted portion includes a thickened and enlarged portion of the heavy metallic substance formed integrally each of the legs. A thickened hub portion is formed contiguous with at least a portion of the central portion of the web and is integral therewith.

According to another aspect of the invention, a method is provided for manufacturing a device for supporting an article in an upright orientation relative to a non-planar surface, the method including forming a web formed of a thin sheet of malleable material; fixing a weighted portion to the web at a position spaced away from a central portion of the web; and covering substantially all of the web and weighted portions with a flexible coating.

The method of the invention may include forming the web by forming a plurality of flexible legs extending from the central portion of the web. Fixing the weighted portion to the web may include forming the weighted portion integrally with the web. The method may also include positioning attachment means at the central portion of the web.

The invention also provides a weighted mounting platform for supporting a normally hand-held portable electronic device, the weighted platform including a plurality of flexible legs extending radially from a common central portion, the legs and common central portion being integrally formed of a heavy and malleable material; a lump of the heavy material integrally formed with each leg at an end thereof distal from the common central portion; a coating of elastomeric material formed over substantially the entire surface of the flexible legs, the common central portion and the integrally formed lumps; and an attaching means positioned at the common central portion for attaching a mounting device.

According to another aspect of the invention, the heavy material of which the flexible legs, common central portion and lump formed integrally with each leg is a metallic material including lead.

According to another aspect of the invention, the weighted mounting platform may include an intermediary mounting device coupled by the attaching means to the common central portion. The mounting device may be structured as one of a male and a female portion of a ball-and-socket clamping device. The attaching means may be a plurality of fasteners for coupling the intermediary mounting device to the common central portion.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 illustrates an embodiment of the invention wherein the weighted mounting platform is provided with a coat or sheath of a flexible elastomeric material and a ball-type universally adjustable mounting structure;

FIG. 3A illustrates an embodiment of the invention wherein the weighted mounting platform is provided with a coat or sheath of a flexible elastomeric material and a socket-type universally adjustable mounting structure;

DETAILED DESCRIPTION OF PREFERRED EMBODIMENT

In the Figures, like numerals indicate like elements.

Figure 1:
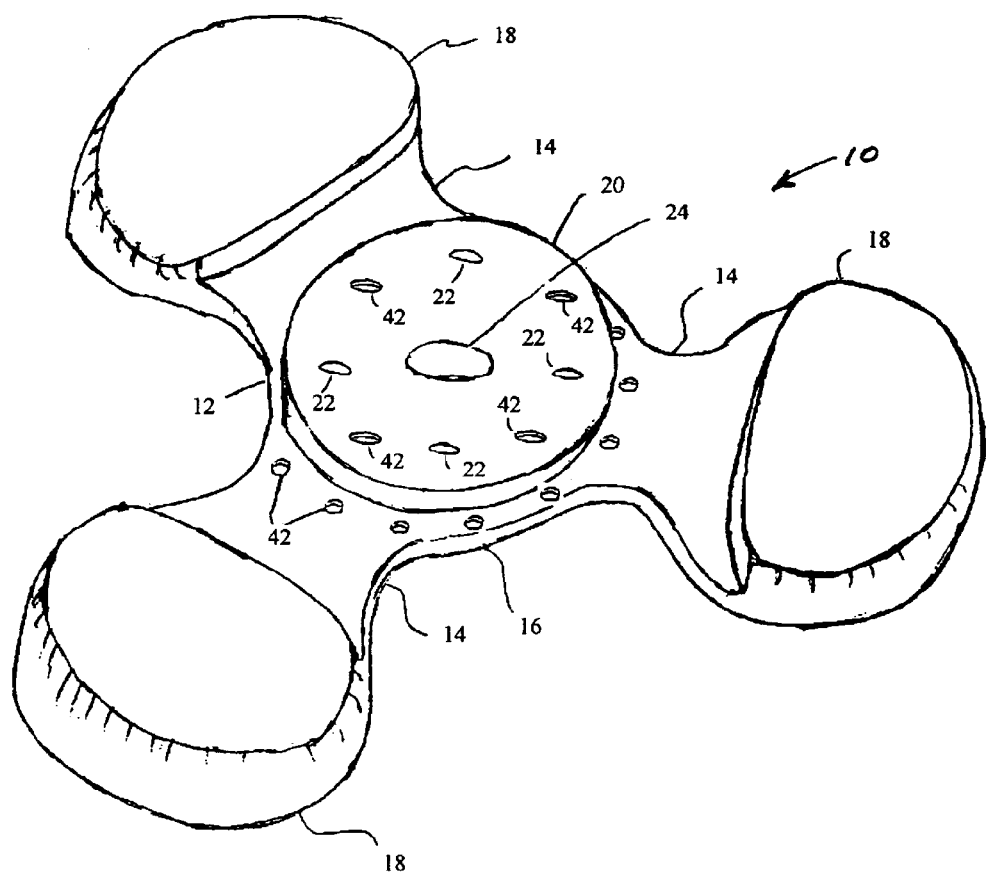
FIG. 1 is a pictorial view that illustrates the invention embodied as a weighted mounting platform that is conformable to curving and other non-planar surfaces.

FIG. 1 is a pictorial view that illustrates the invention embodied as a weighted mounting platform 10 that is conformable to curving and other non-planar surfaces. As illustrated in FIG. 1, the weighted mounting platform 10 includes a thin sheet of malleable material forming a web 12 having a plurality of legs 14 extending radially from a common disc-shaped center portion 16. The legs 14 may be necked-down before expanding into widened portions at their outer ends distal from the central portion 16. Additional material is provided over the widened portion of each of the legs 14 in the form of a large solid lump or mass 18 which is both thicker and wider than the legs 14. A thicker solid plate or hub 20 may be provided over at least a portion of the central portion 16.

According to one embodiment of the invention, the thin sheet of material forming the web 12 is a heavy but malleable material such as lead. The material is optionally another heavy, malleable metal but may also be a ductile filled-elastomer such as plastic or rubber or another material that is that is suitably malleable in thin sheets. The hub 20 and the enlarged masses 18 are also formed of a heavy material such as lead, a filled-elastomer, or flexible fabric or plastic sacks filled with a heavy liquid or gel material. Preferably, the hub 20 and the enlarged masses 18 depending from the distal ends of the legs 14 are formed integrally with the web 12 as in a die casting operation so that the hub 20, web 12 and enlarged solid masses 18 are a single solid integral structure.

As a result of being formed as thin sheet portions the leg portions 14 and center portion 16 of the web 12 form a web of malleable material that is sufficiently flexible to conform to curving and other non-planar surfaces. The greater volume the enlarged solid masses 18 causes them to be both heavier and more rigid than the legs 14 from which they depend. The greater weight of the solid masses 18 act to hold the entire weighted mounting platform 10 in whatever position it is placed. Thus, when placed on a curving or non-planar surface such as a automobile dashboard or console, the legs 14 conform to the hills and valleys, while the weightier soid masses 18 provide sufficient inertia to maintain the weighted mounting platform 10 in position against the tendency to slip and slide when the vehicle accelerates, brakes or turns.

Furthermore, means are provided for attaching a desired article either directly or through an intermediary mounting device to the central portion 16 of the web 12 or the optional hub 20. For example, the attaching means is a plurality of apertures 22 provided in a pattern around the center of the hub 20, and fasteners (shown in subsequent Figures) are passed through to attach the article or the intermediary mounting device. The apertures 22 may be shaped to orient the fasteners relative to the weighted mounting platform 10. For example, the apertures 22 may be formed with a square or hexagonal shape to match the head of a square or hex bolt fastener. The fasteners couple the article or intermediary mounting device to the hub 20 which supports the attachment in an upright orientation relative to the non-planar mounting surface.

Alternatively, the attaching means is a single aperture 24 provided at or near the center of the hub 20. A fastener can be passed through the aperture 24 to attach the article or the intermediary mounting device.

Figure 2A:
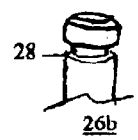
FIG. 2A illustrates another embodiment of the fastener formed integrally with the central hub.
Figure 2B:
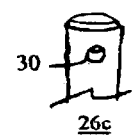
FIG. 2B illustrates still another embodiment of the fastener formed integrally with the central hub.
Figure 2:
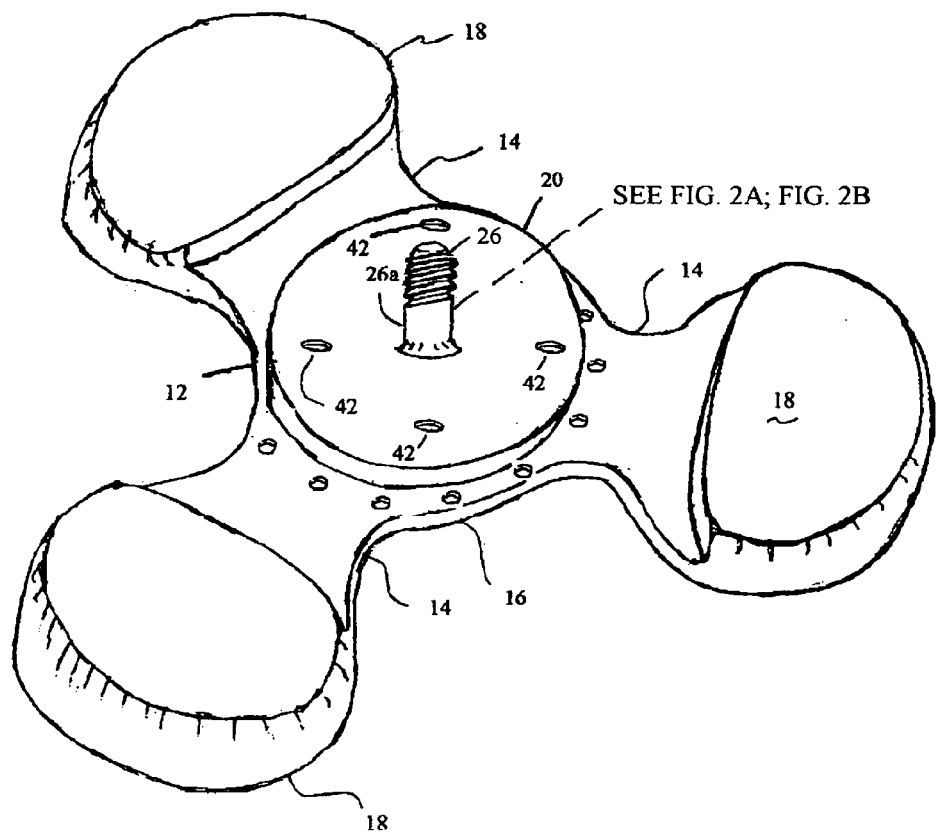
FIG. 2 illustrates still other embodiments of the weighted mounting platform of the invention wherein the attaching means is a fastener formed integrally with a central hub.

FIG. 2 illustrates still other embodiments of the invention wherein the attaching means is a fastener 26 formed integrally with the hub. The fastener 26 may be a stud such as a threaded stud 26a, as shown in FIG. 2. Alternatively, the integral fastener 26 is a cylindrical stud 26b, as shown in FIG. 2A, having a groove 28 fashioned to accept a snap ring (not shown). According to another alternative embodiment, the integral fastener 26 is a cylindrical stud 26c, as shown in FIG. 2B, having an aperture 30 for accepting a keeper pin (not shown), or another useful integrally formed fastener. The fastener 26 may be formed of the same material as the hub 20, or it may be a discrete element about which the hub 20 is formed during the manufacturing process so that it is embedded in the material of the hub 20.

FIG. 3 illustrates an embodiment of the invention wherein the weighted mounting platform 10 is provided with a coat or sheath 32 of a flexible elastomeric material. In FIG. 3 the coating 32 is shown covering the hub 20, the enlarged masses 18 and the entire web 12 except a flexible portion of one of the legs 14. The coating 32 is, for example, a flexible elastomeric material such as rubber, plastic, urethane, latex, vinyl or polyvinyl, or another suitable elastomeric material that protects the user and the mounting surface from contact with the weight material while permitting the web 12 to conform to a non-planar mounting surface. The coating 32 also strengthens the thin-sheet web 12 and leg portions 14 against fatigue failure that may result with repeated or excessive bending. Furthermore, if the thin sheet web 12 and leg 14 portions do fail, the coating 32 both contains the debris and permits the weighted platform 10 to continue to function in an approximation of the intended manner. According to one embodiment, the coating 32 is formed of a low durometer, rubbery material with a surface having a high coefficient of friction. Thus, the coating 32 is a pliable material having a low hardness, for example, in the range of 30 to 40 Shore D and a slightly viscous "tacky" or "sticky" non-skid surface that tends to resist sliding when placed in weighted contact with typical vehicle upholstery and cab or cockpit finish materials such as vinyl, leather, cloth, glass, anodized or painted aluminum, and fiberglass.

Figure 4:
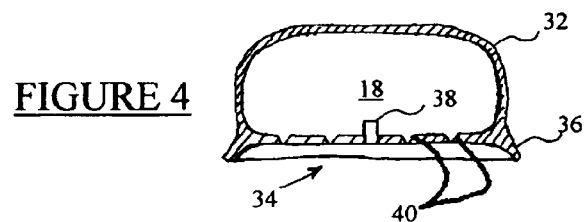
FIG. 4 illustrates one means for fixing the integrally formed or assembled weighted mounting platform of the invention within an injection molding die for applying the coat or sheath of a flexible elastomeric material shown in FIG. 3.

The tendency to resist sliding is optionally reinforced by a shallow cup-shaped depression 34 formed in the coating 32 on the bottom surface of the weighted platform 10, as shown in FIG. 4, which is a cross-section view the distal end of one of the legs 14 including the enlarged mass 18. In FIG. 4 a skirt 36 extending from the base portion of the coating 32 at the periphery of the enlarged mass 18 forms the cup-shaped depression 34. The skirt 36 is formed integrally with the coating 32 and of the same elastomeric material. The cup-shaped depression 34 is optionally formed on the bottom surface of the weighted platform 10 opposite the hub portion 20. The cup-shaped depression 34 is optionally provided as a quantity of smaller depressions 34 in a pattern on the bottom surface of each enlarged mass 18.

In practice the coating 32, commonly known as an overmold, is applied during a molding process, for example, an injection molding process. During such a process the portions to be coated, i.e., the web 12, masses 18 and hub portion 20, are positioned in one side of a heated mold die, a second side of the die is closed over the portions to be coated, and a stream of liquid coating material is injected under pressure into the closed die. Usually, the coating 32 is formed of a thermosetting substance or a thermoplastic resin that sets-up quickly in the heated die. The die is opened and the thoroughly coated weighted platform 10 is ejected. Installation of the web 12, masses 18 and hub 20 portions of the weighted platform 10 into the die is greatly simplified when these parts are either integrally formed, as by die casting an integral structure, or otherwise assembled and fastened or fixed into a single unit. Also, the relative positions of the parts within the die cavity are better maintained when formed or assembled into a single, integral unit.

FIG. 4 illustrates one means for fixing the integrally formed or assembled weighted mounting platform 10 within the injection molding die. Complete and uniform disposal of the coating 32 over the exterior of the weighted platform 10 is assured only when the web 12, masses 18 and hub 20 portions are accurately positioned relative to the interior of the die leaving a predetermined uniform spacing between the parts of the weighted platform 10 and the interior surfaces of the mold die, and those positions are maintained during the high pressure introduction of the coating material into the die cavity. Therefore, as shown in FIG. 4, a locating hole 38 is provided in a surface of the mass 18 at the end of the arm 14. The locating hole 38 mates with a locating pin (not shown) in the die to position the mass 18. The weighted platform 10 is positioned relative to the die when one of the locating holes 38 is provided in at least two of the masses 18 and mating pins are located in the die. For ease of assembly into the die one of the locating holes 38 is provided at a substantially identical position in the surface of each of the masses 18. The depth of the locating holes 38 relative to the length of the mating locating pin in the die is sufficient for fixing the spacing between the bottom surface of the weighted platform 10 and the interior surface of the die so that a uniform thickness coating 32 is achieved. During the molding process the liquid coating material is injected under pressure into the die through a gate (not shown) formed in the die central to the hub portion 20 and located opposite the upper surface of the weighted platform 10. Thus, the pressure of the injected liquid serves to force the weighted platform 10 downwardly toward the bottom surface of the die. The locating pins bottom-out in the locating holes 38 and hold the bottom surface of the weighted platform 10 spaced away from the bottom interior surface of the die. This spacing provides the uniform thickness of the coating 32 on the bottom of the weighted platform 10, and furthermore, provides the uniform thickness of the coating 32 over the remainder of the weighted platform 10.

The uniformity of the coating 32 is thus a function of the uniformity of both the depth of the locating holes 38 and the length of the locating pins in the die. If the weighted platform 10 is cast using multiple different die casting molds and the coating 32 is applied using multiple different injection molding dies, the uniformity of both the depth of the locating holes 38 and the length of the locating pins may be problematic relative to achieving a uniform thickness of the coating 32. Therefore, one or a quantity of spacers 40 are projected from the bottom of the weighted platform 10, for example, from the bottom of each of the masses 18. The spacers 40 are optionally integrally formed in the weighted platform 10 during the die casting operation and eliminate the need for uniformity of length among the different locating pins between different injection mold dies and between different locating pins within a single die. The lengths of the different projecting spacers 40 is more easily controlled than the depth of the locating holes 38 due to the nature of the die casting process. Widely separating a quantity of the spacers 40 in a pattern such as a circle, rectangle or triangle furthermore eliminates any tendency of the weighted platform 10 to tip during the overmolding operation.

Generally, unless otherwise provided for, the die cast surface of the weighted platform 10 is substantially smooth and may lack sufficient texture for securely maintaining adhesion between the outer surfaces of the weighted platform 10 and the overmolded coating 32. Extended use and multiple expansions and contractions due to uncontrolled temperature variations may eventually partially or wholly sever the initial adhesion. Thus, the downwardly projecting spacers 40 further provide a quantity of anchors for fixing the position of the coating 32 relative to the bottom surface of the weighted platform 10.

FIGS. 1 and 2 also illustrate an additional means for anchoring the coating 32. For example, a pattern of apertures through or shallow surface depressions 42 is provided in the top surface of the weighted platform 10. In the example illustrated, the anchoring means is a first quantity of surface depressions 42 provided in the top surface of the hub 20, and a second quantity of smaller surface depressions 42 provided in the top surface of the web 12 surrounding the hub 20. During the injection molding operation the liquid coating material flows over the surface of the weighted platform 10, entering into and filling the holes or depressions 42. When cured, the plugs of material in the holes or depressions 42 form hooks that are integral with the coating 32 and anchor it to the weighted platform 10. As illustrated in FIG. 3, the outer surface of the coating 32 ideally shows no signs of the underlying anchor material filling the holes or depressions 42.

FIG. 3 also illustrates the weighted mounting platform 10 of the invention embodied as a mounting device 44 having the attaching means formed as the pattern of integral apertures 22. A universally adjustable mounting structure 46 is secured to the hub 20 by a quantity of fasteners 48 passing through or engaged with some or all of the apertures 22. The mounting structure 46 is, for example, either the male ball portion 46*a*, as illustrated in FIG. 3, or female socket portion 46*b* of one of many known adjustable ball-and-socket mounting devices, as illustrated generally in FIG. 3A. For example, the mounting structure 46*a* is the resilient compressible male coupling member of the universally positionable mounting device shown and described in U.S. Pat. No. 5,845,885 issued to the inventor of the present invention on Dec. 8, 1998, which is incorporated by reference herein in its entirety, and the mounting structure 46*a* is the one shown and described therein. A mating socket portion is provided on the article to be mounted on the weighted platform 10. Alternatively, the article to be mounted is provided with another of the male ball portions 46*a*, and a double-ended clamping device (not shown) of the type shown and described in U.S. Pat. No. 5,845,885 is used to provide a secure but adjustable connection between the two male ball members 46*a*.

According to an alternative embodiment, the mounting structure 46*a* is the male ball-like member of the geodesic coupler shown and described in U.S. patent application Ser. No. 09/855,171 entitled GEODESIC MOUNTING APPARATUS, filed in the name of the inventor of the present invention on May 14, 2001, which is incorporated by reference herein in its entirety, and the mounting structure 46*a* is the one shown and described therein. The article to be mounted is provided with a mating clamping device (not shown) of the type shown and described in application Ser. No. 09/855,171.

According to another alternative embodiment, the mounting structure 46a is the male ball member of the substantially stable, load-bearing but relatively adjustable ball and socket mounting device shown and described in U.S. patent application Ser. No. 09/654,245 entitled FLEXIBLE ELECTRONIC MOUNT APPARATUS, filed in the name of the inventor of the present invention on Sep. 2, 2000, which is incorporated by reference herein in its entirety, and the mounting structure 46 is the one shown and described therein.

Alternatively, the mounting structure 46 is the female socket portion 46b of a known adjustable ball-and-socket mounting device, while the article to be mounted on the weighted platform 10 is provided with a mating male ball portion such as the resilient compressible male ball member 46a described in U.S. Pat. No. 5,845,885. For example, the female socket portion 46b has two mating jaws 50 and 52. One jaw 50 is secured to the surface of the hub 20 using the fasteners 48; the other jaw 52 is secured to the first jaw 50 with another fastener 54. Each of the two mating jaws 50, 52 includes internal part spherical socket surfaces 56 (one shown) that, when joined together, partly enclose and capture a male ball portion such as the ball portion 46a shown. The fastener 54 may force together the two mating jaws 50, 52 such that the internal socket surfaces 56 encompass a volume that is smaller than the sphere defined by the individual internal socket surfaces 56. The mating socket halves 50, 52 thus compress or squeeze the resilient compressible male ball member 46a of the ball-and-socket mounting structure, and thereby secure the male ball member 46a and the article to be mounted relative to the weighted platform 10.

According to another alternative embodiment, the female socket portion 46b is structured to receive the male ball member of the geodesic coupler shown and described in application Ser. No. 09/855,171. Accordingly, the internal socket surfaces 56 of two mating halves 50, 52 are formed having multiple interconnected planar surfaces that on average describe a spherical volume. The fastener 54 may force together the two mating jaws 50, 52 50 that the internal socket surfaces 56 partly enclose and capture a male geodesic ball portion such as the ball-like portion 46a described in application Ser. No. 09/855,171.

In another alternative embodiment the female socket portion 46b is structured to receive the male ball member of the adjustable ball and socket mounting device described in application Ser. No. 09/654,245. The female socket portion 46b is thus formed of a resilient material and the internal socket surface 56 is structured as a cup-shaped cavity having an entrance opening sized to accept and capture a mating ball member 46a of the type described in application Ser. No. 09/654,245.

Alternatively, the mounting structure 46 is another suitable structure of conventional design.

Figure 5:
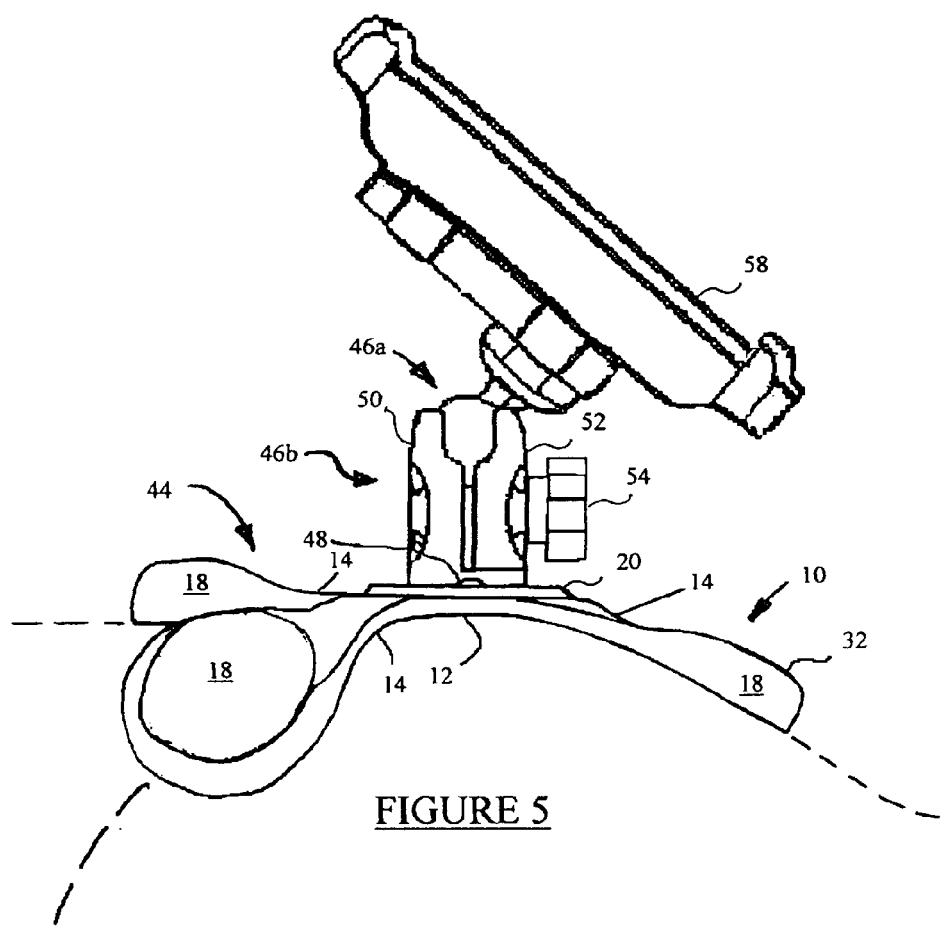
FIG. 5 illustrates one application of a mounting device of the invention for supporting an article in an upright orientation relative to a non-planar surface using a weighted mounting platform of the invention in combination with a cradle for securing a portable electronic device and having a intermediary ball-and-socket clamping device therebetween.

FIG. 5 illustrates one application of the mounting device 44 for supporting an article in an upright orientation relative to a non-planar surface using a weighted mounting platform 10 of the invention in combination with a cradle for securing a portable electronic device and having a intermediary ball-and-socket clamping device therebetween. In FIG. 5 the weighted platform 10 is an integral structure formed of a web 12 having three legs 14 extending radially from a substantially disc-shaped central portion 16 at substantially regular radial spacings. The web 12 is a thin sheet such that the three legs 14 are relatively flexible cross-axis to the plane of the web 12 while being wide enough to achieve relative stiffness in the plane of the web 12. The legs 14 are thus sufficiently flexible to conform the web 12 to a curving or other non-planar surface. Each leg 14 includes an enlarged weighted mass 18 formed integrally therewith at an expanded area distal from the central portion 16. A thickened hub portion 20 partly covers the central portion 16 of the web 12 and is formed integrally therewith; the hub 20 being structured with a pattern of apertures 22 therethrough. Substantially the whole of the weighted platform 10 is covered with a pliable elastomeric coating 32 having a high coefficient of friction on its outer surface. A female socket portion 46b of an adjustable ball-and-socket mounting device of the type described in FIG. 3 is mounted at the center of the top surface of the hub 20 in an upright orientation relative to the hub 20 using a pair of the fasteners 48 passing through two of the apertures 22.

A cradle 58 is structured to retain a portable electronic device such as a hand-held telephone, global positioning system (GPS) receiver, flashlight, or another normally hand-held instrument. The cradle 58 is further equipped with a male ball portion 46a that is sized and structured to mate with the female socket portion 46b of an adjustable ball-and-socket mounting device. For example, the male ball portion 46a is the resilient compressible male ball member described in U.S. Pat. No. 5,845,885. Alternatively, the female socket portion 46b and mating male ball portion 46a are of another known adjustable ball-and-socket mounting device.

In operation, the jaws 50, 52 of the female portion 46b are spread, and the male ball portion 46a is inserted therebetween. The fastener is engaged and tightened thereby drawing the jaws 50, 52 together around the male portion 46a and capturing it securely therebetween. Thereafter, the legs 14 of the weighted mounting platform 10 are pressed to conform the web 12 to a curving or other non-planar surface, and the cradle is oriented upright relative to the mounting surface. The enlarged weighted lumps 18 at the ends of the legs 14 serve to hold relatively stable the entire mounting device 44, including the cradle 58 and a device mounted therein. Thus, a user may conveniently mount a portable or hand-held device on a generally horizontal but non-planar dashboard or console of a vehicle using the mounting device 44 of the invention with reasonable assurance that the device with remain stationary and upright even when the accelerates, brakes and turns.

While the preferred embodiment of the invention has been illustrated and described, it will be appreciated that various changes can be made therein without departing from the spirit and scope of the invention. For example, the weighted masses 18 at the ends of the legs 14 may be interconnected by a portion of the web 12 formed as thin, flexible legs, whereby the weighted mounting platform 10 is wheel-shaped with interconnected weights 18 at the end of spoke-like legs 14. In another example, either or both the enlarged masses 18 and the hub portion 20 are extended either on both the top and bottom surfaces of the thin web portion 12 or on the side opposite that shown in the Figures.

I claim:

1. A weighted mounting platform, comprising:
   a web formed of a thin section of malleable material;
   one or more substantial lumps of weighted material provided at positions spaced away from a central portion of the web by respective necked-down portions formed between the lump of weighted material and the central portion of the web;

a flexible coating substantially covering the web and the one or more weighted portions; and attachment means positioned at the central portion of the web;

wherein the central portion of the web, the one or more substantial lumps of weighted material and the necked down portions are formed as one piece.

2. The mounting platform of claim 1 wherein each of the one or more solid lumps of weighted material further comprises a leg formed of the weighted material and extending radially from the central portion of the web.

3. The mounting platform of claim 1 wherein the malleable material comprises lead.

4. The mounting platform of claim 1, further comprising a thickened hub portion contiguous with at least a portion of the central portion of the web.

5. The mounting platform of claim 4 wherein the hub portion is integral with the central portion of the web.

6. A weighted mounting platform, comprising:

a web formed of a thin section of malleable material;

one or more legs extending radially from the central portion of the web, each of the legs being formed of a substantially enlarged solid lump of weighted material provided at a position spaced away from a central portion of the web and a necked-down portion of the weighted material formed between the solid lump of weighted material and the central portion of the web;

a flexible coating substantially covering the web and the one or more weighted portions; and attachment means positioned at the central portion of the web for attaching an external article;

wherein the central portion of the web, the one or more substantially enlarged sold lumps of weighted material, and the neck-down portions are formed as one piece.

7. A device for supporting an article in an upright orientation relative to a non-planar surface, the device comprising:

a web formed of a plurality of flexible legs extending from a common center, one or more of the legs having a weight formed of an enlarged solid lump distal from the common center with a necked-down portion formed between the weight and the common center;

a sheath of elastomeric material substantially coating the web of flexible legs and the one or more weights; and attachment means positioned adjacent to the common center for attaching a mounting device;

wherein the common center of the web, the one or more weights formed of an enlarged solid lump, and the necked-down portions are formed as one piece.

8. The device of claim 7 wherein the one or more weights are formed integrally with each of the plurality of flexible legs.

9. The device of claim 7 wherein the flexible legs extend radially from the common center.

10. The device of claim 7, further comprising a weighted hub portion positioned at the common center from which the legs extend.

11. The device of claim 7 wherein the attachment means includes a quantity of fasteners coupling one of a male and a female portion of a ball-and-socket mounting device.

12. A weighted mounting platform, comprising:

a means for conforming to a non-planar surface, the conforming means comprising a plurality of lens radially projected from a common center;

a stabilizing means formed of a plurality of lumps of heavy material substantially enlarged relative to the conforming means and coupled to the conforming means at different positions spaced away from the common center for maintaining the conforming means in a substantially constant position relative to the non-planar surface;

a means for substantially isolating the conforming means and the stabilizing means from a surrounding environment; and a supporting coupled for supporting an article in an upright orientation relative to the non-planar surface;

wherein the common center, the plurality of legs and the plurality of enlarged lumps of heavy material are formed as one piece.

13. The mounting platform of claim 12 wherein the plurality of legs are formed integrally with respective lumps of the heavy material.

14. The mounting platform of claim 13 wherein the leg means are formed of a thickness of a substantially malleable material.

15. The mounting platform of claim 13 wherein the stabilizing means are integrally formed with the conforming means.

16. The mounting platform of claim 15 wherein the isolating means further comprises means for gripping the non-planar surface.

17. The mounting platform of claim 12 wherein the isolating means further comprises a sheath of elastomeric material.

18. A method for manufacturing a device for supporting an article in an upright orientation relative to a non-planar surface, the method comprising:

forming a web formed of a thin sheet of malleable material;

fixing a plurality of weighted portions to the web at a plurality of different positions spaced away from a central portion of the web and isolated there from by respective necked-down portions formed there between such that the central portion of the web, the weighted portions and the necked-down portions are formed as one piece; and covering substantially all of the web and weighted portions with a flexible coating.

19. The method of claim 18, further comprising positioning attachment means at the central portion of the web.

20. The method of claim 18 wherein forming a web further comprises forming a plurality of flexible legs extending from the central portion of the web.

21. The method of claim 18 wherein fixing the to the web further comprises forming the weighted portions integrally with the web.

22. A weighted mounting platform for supporting a hand-held device, the weighted mounting platform comprising:

a plurality of flexible legs extending radially from a common central portion, the legs and common central portion being integrally formed of a heavy and malleable material;

a substantially solid and unitary lump of the heavy material integrally formed with each leg at an end thereof distal from the common central portion;

a coating of elastomeric material formed over substantially the entire surface of the flexible legs, the common central portion and the integrally formed lumps; and an attaching means positioned at the common central portion for attaching a mounting device;

wherein the common central portion, the substantially solid and unitary lumps of heavy material and the flexible legs are formed as one piece.

23. The mounting platform of claim 22, further comprising an intermediary mounting device coupled by the attaching means to the common central portion.

24. The mounting platform of claim 23 wherein the mounting device is structured as one of a male and a female portion of a ball-and-socket clamping device.

25. The mounting platform of claim 23 wherein the attaching means is a plurality of fasteners for coupling the intermediary mounting device to the common central portion.

26. The mounting platform of claim 23 wherein the heavy material comprises a metallic material including lead.

* * * * *